United States Patent
Takeuchi et al.

(10) Patent No.: US 8,316,063 B2
(45) Date of Patent: Nov. 20, 2012

(54) DATA-DRIVEN DATABASE PROCESSOR

(75) Inventors: Ken Takeuchi, Tokyo (JP); Yuji Takeuchi, Tokyo (JP); Takahiro Yodo, Tokyo (JP)

(73) Assignee: Rsun Corporation, Tokyo (JP)

( * ) Notice: Subject to any disclaimer, the term of this patent is extended or adjusted under 35 U.S.C. 154(b) by 30 days.

(21) Appl. No.: 12/812,016

(22) PCT Filed: Dec. 24, 2008

(86) PCT No.: PCT/JP2008/003923
§ 371 (c)(1),
(2), (4) Date: Sep. 29, 2010

(87) PCT Pub. No.: WO2009/087730
PCT Pub. Date: Jul. 16, 2009

(65) Prior Publication Data
US 2011/0010402 A1 Jan. 13, 2011

(30) Foreign Application Priority Data
Jan. 11, 2008 (JP) ................................ 2008-003793

(51) Int. Cl.
*G06F 7/00* (2006.01)

(52) U.S. Cl. . 707/812; 707/723; 707/758; 707/E17.044; 715/810; 709/201

(58) Field of Classification Search .................. 707/812, 707/759; 340/572.1
See application file for complete search history.

(56) References Cited

U.S. PATENT DOCUMENTS

| | | | |
|---|---|---|---|
| RE37,857 E * | 9/2002 | Browne | 379/114.1 |
| 7,873,607 B1 * | 1/2011 | Knutson et al. | 707/692 |
| 7,969,306 B2 * | 6/2011 | Ebert et al. | 340/572.1 |
| 2003/0110155 A1 | 6/2003 | Minagawa | |
| 2008/0208838 A1 * | 8/2008 | Friedlander et al. | 707/5 |
| 2010/0250572 A1 * | 9/2010 | Chen et al. | 707/759 |

FOREIGN PATENT DOCUMENTS

| | | |
|---|---|---|
| JP | 06-149636 | 5/1994 |
| JP | 2003-177948 | 6/2003 |

OTHER PUBLICATIONS

SQL 2003 Handbook, pp. 192-199, with English translation.

(Continued)

*Primary Examiner* — Shyue Jiunn Hwa (57) ABSTRACT

Provided is a technique for a data-driven database which frees a user from having to be conscious of a sequence in which instructions of a program for accessing a database are described, an interrelation of data items, and the like, and from having to describe redundant instructions. A data-driven database processor includes: schema definition storage means 2 for storing a schema definition of a database 24; derived definition storage means 3 for storing a derived definition describing a cause-and-effect relationship that exists when a value of a given data item is derived from a value of another data item; derived definition processing means 26 for generating a trigger program 27 that makes a chain of changes to values of data items based on the cause-and-effect relationship described in the derived definition; and a database management system 23 for executing the trigger program 27 when a change is made to the other data item that affects the value of the given data item.

3 Claims, 6 Drawing Sheets

OTHER PUBLICATIONS

"Kanzen Hozonban! Kiso kara Manabu Oracle Database no Sekkei kara Jisso Made Dai 2 Bu Jissenhen"; DB Magazine Oct. 2000, pp. 103-104; with English translation.

"Relational o Koete", Nikkei Computer, Jun. 3, 1991, pp. 70-73 with English translation.

"CS System Kochiku Shien Tool", Nikkei Open Systems, Apr. 1994, No. 13, p. 144, with English translation.

Japanese Application No. 2009-548812 Office Action dated Jun. 8, 2010, 8 pages including English translation.

Japanese Application No. 2009-548812 Decision of Rejection dated Sep. 28, 2010, 6 pages including English translation.

* cited by examiner

| TABLE A |
|---|
| SCHEMA DEFINITION |
| A1 decimal(5) |
| A2 decimal(5) |
| A3 decimal(5) |
| A4 decimal(5) |

| TABLE B |
|---|
| SCHEMA DEFINITION |
| B1 decimal(5) |
| B2 decimal(5) |
| B3 decimal(5) |
| B4 decimal(5) |

| TABLE C |
|---|
| SCHEMA DEFINITION |
| C1 decimal(5) |
| C2 decimal(5) |
| C3 decimal(5) |
| C4 decimal(5) |

*FIG.6*

PRIOR ART

DATA-DRIVEN DATABASE PROCESSOR

TECHNICAL FIELD

The present invention relates to technology to process a data-driven database, and more particularly to a data-driven database processor, and a processing method and processing program therefore that alleviate the burden of creating an access program.

BACKGROUND ART

Conventionally, computer programs for handling data in a database are formatted so as to be sequentially executed regardless of language format. In other words, the respective instructions described in such computer programs have to be executed in a described order.

Figure 6:
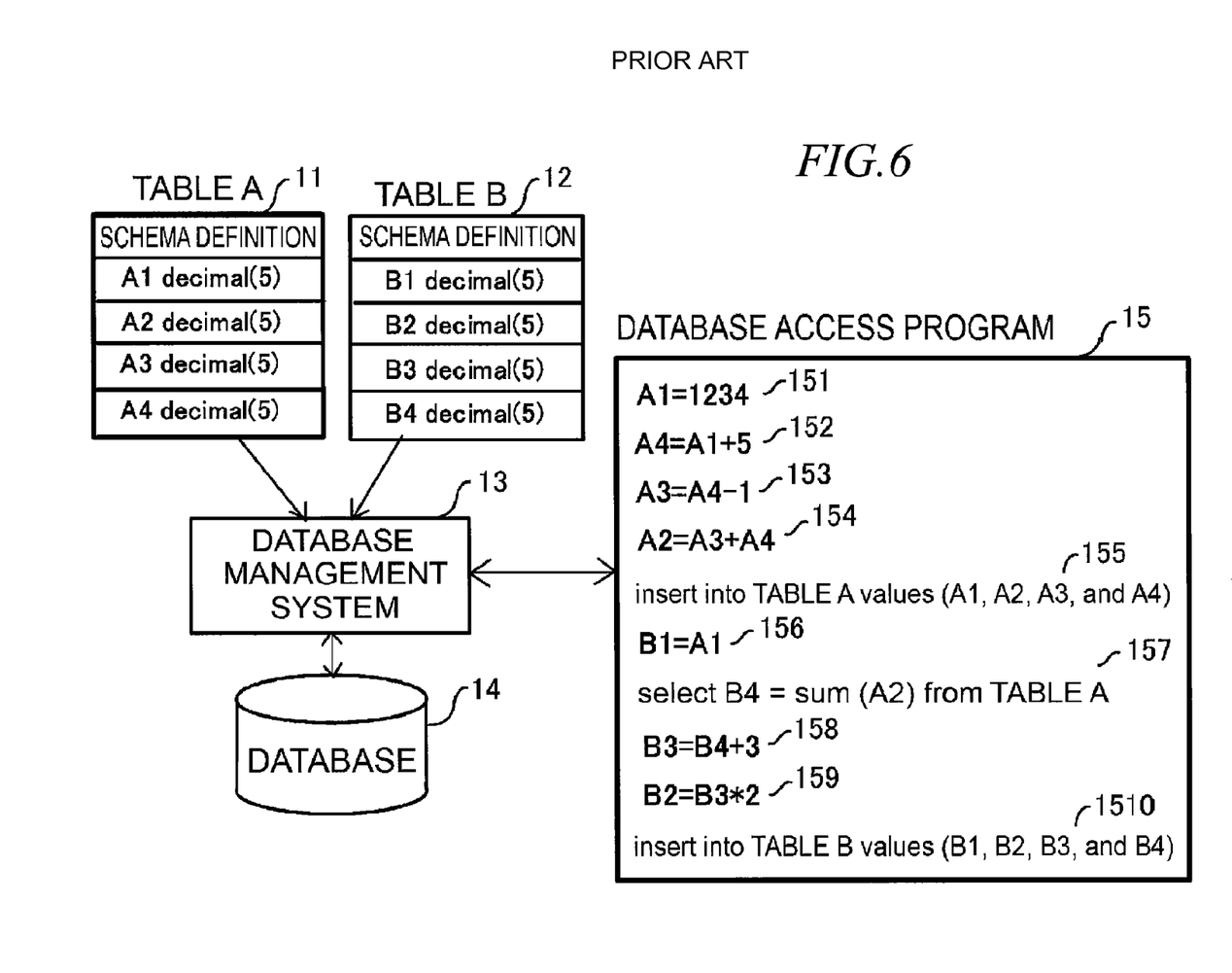
FIG. 6 is an explanatory diagram illustrating an example of access to a database according to conventional art.

For example, FIG. 6 illustrates an example of a general program for accessing a database. In FIG. 6, reference numerals 11 and 12 denote two schema definitions existing in the database. A schema definition is a description defining a data structure and, for example, defines a plurality of data items and a table (chart) made up of the data items. In the example illustrated in FIG. 6, a schema definition 11 defines a table A and a schema definition 12 defines a table B.

Reference numeral 13 denotes a database management system, 14 a database, and 15 a sequential database access program. According to schema definitions 11 and 12, the database management system 13 receives an access instruction from the database access program 15 and performs data processing on the database 14.

Reference numerals 151 to 1510 denoting described contents of the database access program 15 represent a description example of access instructions for the database. Reference numeral 151 denotes an instruction to substitute a value 1234 into A1. Reference numeral 152 denotes an instruction to add 5 to the value of A1 and substitute the sum into A4. Reference numeral 153 denotes an instruction to subtract 1 from the value of A4 and substitute the difference into A3. Reference numeral 154 denotes an instruction to add up the values of A3 and A4 and substitute the sum into A2.

Reference numeral 155 denotes an insert statement, a SQL statement that is a statement for accessing the database. The insert statement is an instruction to newly store a value in the database 14. In this example, reference numeral 155 denotes an instruction to store data of A1, A2, A3, and A4 in the table A.

Reference numeral 156 denotes an instruction to substitute a value of A1 into B1. Reference numeral 157 denotes an instruction to substitute a summation of values of A2 of all records in the table A into B4. Reference numeral 158 denotes an instruction to add 3 to B4 and substitute the sum into B3. Reference numeral 159 denotes an instruction to multiply B3 by 2 and substitute the product into B2. Reference numeral 1510 denotes an instruction by an insert statement to store data of B1, B2, B3, and B4 in the table B.

With such a sequential database access program 15, interchanging the sequence of instructions from 151 to 1510 results in changes in values to be stored in the database 14. For example, if the sequence of 152 and 153 is inversely described and executed, since A3 is computed before a value is substituted into A4, the value of A3 ends up being different from when 152 and 153 are not interchanged. This means that whenever a programmer writes a program, the program must be written with utmost case for the sequence in which instructions are described.

Meanwhile, prior methods of reducing the effort expended by a programmer to write a database access program include the methods described below (refer to Non-Patent Document 1). As a first method, as many as possible of instructions which are normally described in a program by a programmer are incorporated into functions of a database management system. For example, by defining a computation between data items in a view description of the database, a description of an instruction to perform the computation can be eliminated from the database access program.

In this case, a view description refers to a description to provide an appearance of a single virtual table by, for example, selecting and deriving desired data from one or a plurality of tables. Since the view description is a virtual table description, unlike a real table, the description itself does not contain data.

Another method is to equip the database management system with a trigger function. A trigger function is a function in which processing such as updating performed on a table triggers processing such as updating on another table. Using the trigger function, in a plurality of database access programs that access the same database, processing normally described at a plurality of locations can now be described integrated at a single location. Accordingly, a reduction in a description length of database access programs has been achieved.

Moreover, an automatic conversion system that enables a database to use a utilization program of another database by automatically modifying table names, item names, and the like of the program is disclosed in Patent Document 1. Furthermore, a technique for converting data by using open, close, name change (rename), production (create), delete, or the like as a trigger is disclosed in Patent Document 2.

Non-Patent Document 1: Masashi Tsuchida, Takashi Kodera: "SQL 2003 Handbook", Soft Research Center Inc., 2004
Patent Document 1: Japanese Patent Application Laid-open No. H6-149636
Patent Document 2: Japanese Patent Application Laid-open No. 2003-177948

However, there have been no significant changes in the description method of programs for accessing a database and data processing is still performed in the sequence of instructions in programs written by users such as programmers. Therefore, the same situation exists in that a user must create a database access program while being conscious of the sequence in which instructions are described.

Furthermore, in addition to the sequence in which instructions are described, the user must write the database access program while also paying attention to the interrelation of all data items.

Moreover, the user must redundantly describe an instruction for computing the same data item for each database access program. This problematically results in an increase in the program description length.

DISCLOSURE OF THE INVENTION

The present invention has been made in order to solve the aforementioned problems present in conventional art, and an object of the present invention is to provide a data-driven database processor, a data-driven database processing method, and a data-driven database processing program which free a user from having to be conscious of a sequence in which instructions of a program for accessing a database are described, an interrelation of data items, and the like and from having to describe redundant instructions.

In order to achieve the object described above, a data-driven database processor according to the present invention has: schema definition storage means for storing a schema definition of a database; derived definition storage means for storing a derived definition describing a cause-and-effect relationship between a data item in the schema definition and another data item for deriving the data item; derived definition processing means for generating a trigger program that makes a chain of changes to data items based on the derived definition; and a database management system for executing the trigger program when a change is made to another data item that affects the data item. Moreover, inventions that interpret the present invention as a data-driven database processing method and a data-driven database processing program are also modes of the present invention.

In the mode described above, a user need only simply describe a derived definition while focusing solely on a cause-and-effect relationship that shows from which other data item an object data item is derived. Therefore, there is no more need to concentrate on a sequence in which instructions are described and on an interrelation between the object data item and all data items, which had been required by conventional sequential programs. Consequently, the effort required to create a database access program is significantly reduced.

In addition, a chain of changes considered necessary based on a cause-and-effect relationship can be made by a mere single description of a derived definition corresponding to a schema. Therefore, a user need only describe, into the database access program, a data operation instruction to the data item that is causing the cause-and-effect relationship. Consequently, an advantage is gained in that the description length of the database access program is significantly reduced.

As described above, the present invention is capable of providing a data-driven database processor, a data-driven database processing method, and a data-driven database processing program which free a user from having to be conscious of a sequence in which instructions of a program for accessing a database are described, an interrelation of data items, and the like and from having to describe redundant instructions.

BEST MODE FOR CARRYING OUT THE INVENTION

Next, best modes (hereinafter referred to as embodiments) for carrying out the present invention will be described in detail with reference to the drawings.

[Summary of Embodiment]

Figure 1:
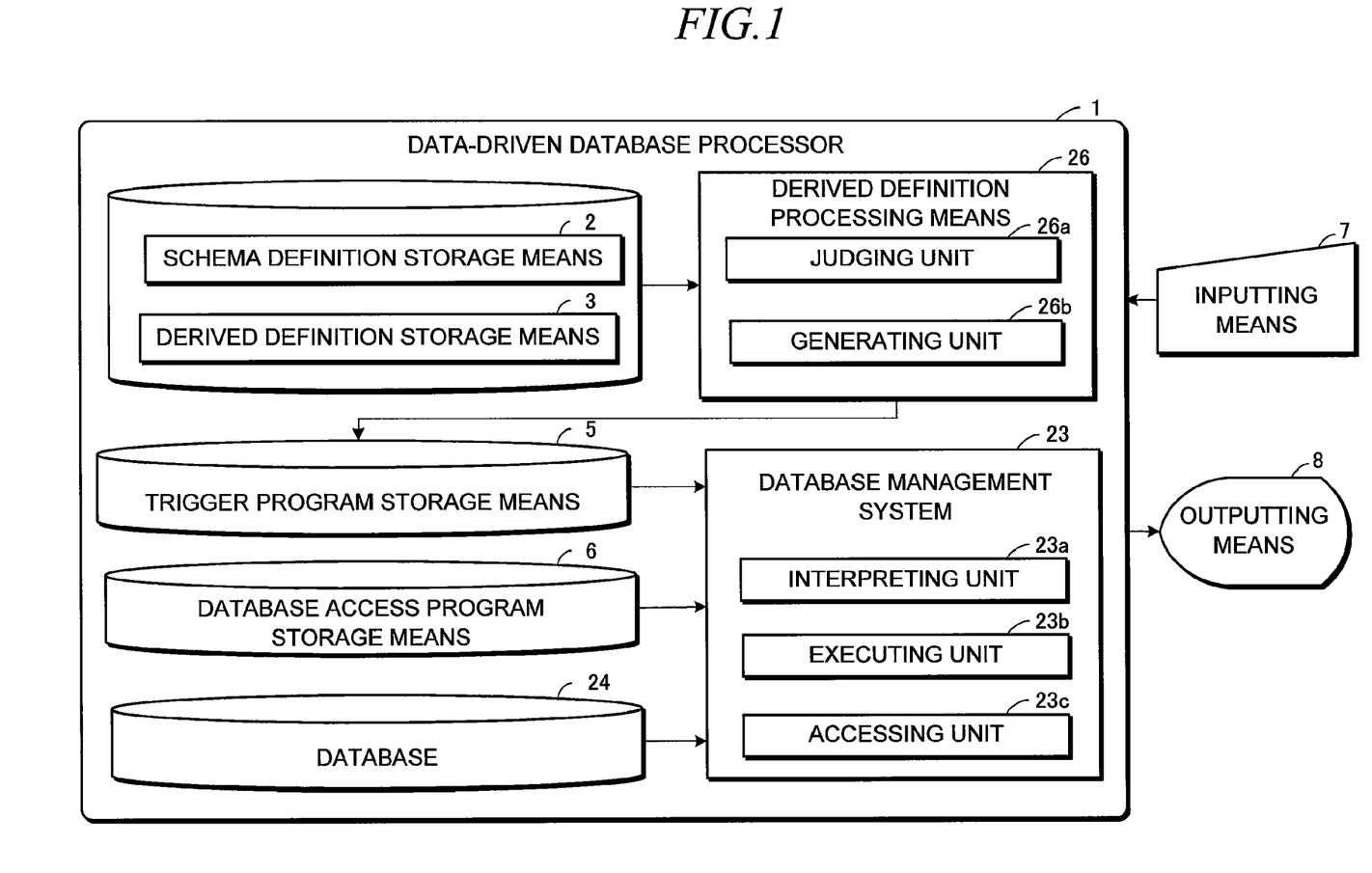
FIG. 1 is a functional block diagram illustrating an embodiment of a data-driven database processor according to the present invention.

As illustrated in FIG. 1, in the present embodiment, derived definition storage means 3 stores a derived definition that is a description of a cause-and-effect relationship that shows from which other data item a data item described in a schema definition is derived. Based on the derived definition, derived definition processing means 26 generates a trigger program 27 (refer to FIG. 3).

Then, triggered by a change made by a database access program 25 (refer to FIG. 3) to a data item causing the cause-and-effect relationship, a database management system 23 executes the trigger program 27 to enable a chain of changes to be automatically made to values of all data items affected by the value of the data item.

[Configuration of Embodiment]

Next, a configuration of the present embodiment will be described. A data-driven database processor 1 according to the present embodiment is configured by, for example, implementing functions such as described below with a computer run by a predetermined program. FIG. 1 is a functional block diagram in which each function has been virtually blocked. Moreover, methods of implementing the functions, a program for implementing the functions, and a storage medium storing the program are also modes of the present invention.

That is, the data-driven database processor 1 according to the present embodiment comprises a database 24, a database management system 23, schema definition storage means 2, derived definition storage means 3, derived definition processing means 26, trigger program storage means 5, database access program storage means 6, inputting means 7, outputting means 8, and the like.

The database 24 is storage means storing data to be handled in the present embodiment. The database management system 23 is means for integrally managing access to the database 24. The database management system 23 comprises, for example, an interpreting unit 23a that interprets the database access program 25 to be described later, an executing unit 23b that executes the program according to an interpretation by the interpreting unit 23a, an accessing unit 23c that executes an access to the database 24, and the like.

Consequently, according to a request (inquiry) inputted using the inputting means 7, the database management system 23 is able to retrieve target data from the database 24 and perform requested processing such as adding, changing, and updating of the data. Other functions included in a general database management system such as data consistency and concurrent control are well known techniques and descriptions thereof will be omitted.

The schema definition storage means 2 is means for storing a schema definition defining a data structure for generating a table made up of data items. The derived definition storage means 3 is means for storing a derived definition describing a cause-and-effect relationship for deriving data items. The derived definition processing means 26 is means for creating a trigger program 27, to be described later, based on the derived definition. The derived definition processing means 26 comprises a judging unit 26a and a generating unit 26b. The judging unit 26a is means for judging a sequence in which derived definitions are to be executed based on the cause-and-effect relationship. The generating unit 26b is means for generating the trigger program 27 based on a judgment result of the judging unit 26a.

The trigger program storage means 5 is means for storing the trigger program 27 generated by the derived definition processing means 26. The database access program storage means 6 is means for storing a database access program 25 for accessing the database 24.

The inputting means 7 is means to be used by a user (widely including operators of the database 24 such as a programmer and an administrator) to input various information to the data-driven database processor 1 in order to operate the data-driven database processor 1. Any input device usable at present or in the future such as a keyboard, a mouse, and a touch panel can be used as the inputting means 7. The inputting means 7 enables the user to input a data item, a schema definition, a derived definition, the database access program 25, and the like, and the database management system 23 performs processing in response to such input.

The outputting means 8 is means for enabling contents of the database 24, progress of processing, and the like of the data-driven database processor 1 to become visible to the user by outputting the contents, process, and the like in various modes. Any output device usable at present or in the future such as a display and a printer can be used as the outputting means 8.

Any storage medium usable at present or in the future such as various memories and hard disks of a computer is applicable as a storage area for the schema definition storage means 2, the derived definition storage means 3, the trigger program storage means 5, the database access program storage means 6, the database 24, and the like described above. While the respective storage means 2, 3, 5, and 6 and the database 24 have been conceptually distinguished from each other in the above description, a part of or all of the storage means and the database 24 may be implemented in a common storage medium.

In addition, the derived definition processing means 26, the database management system 23, and the like are to be implemented by a control unit comprising a CPU, a memory, and other peripheral circuits which run according to a program. The control unit is equipped with functions included in a general computer such as an inputting/outputting function of information between the inputting means 7 and the outputting means 8 and a computing function.

[Operations of Embodiment]

Figure 2:
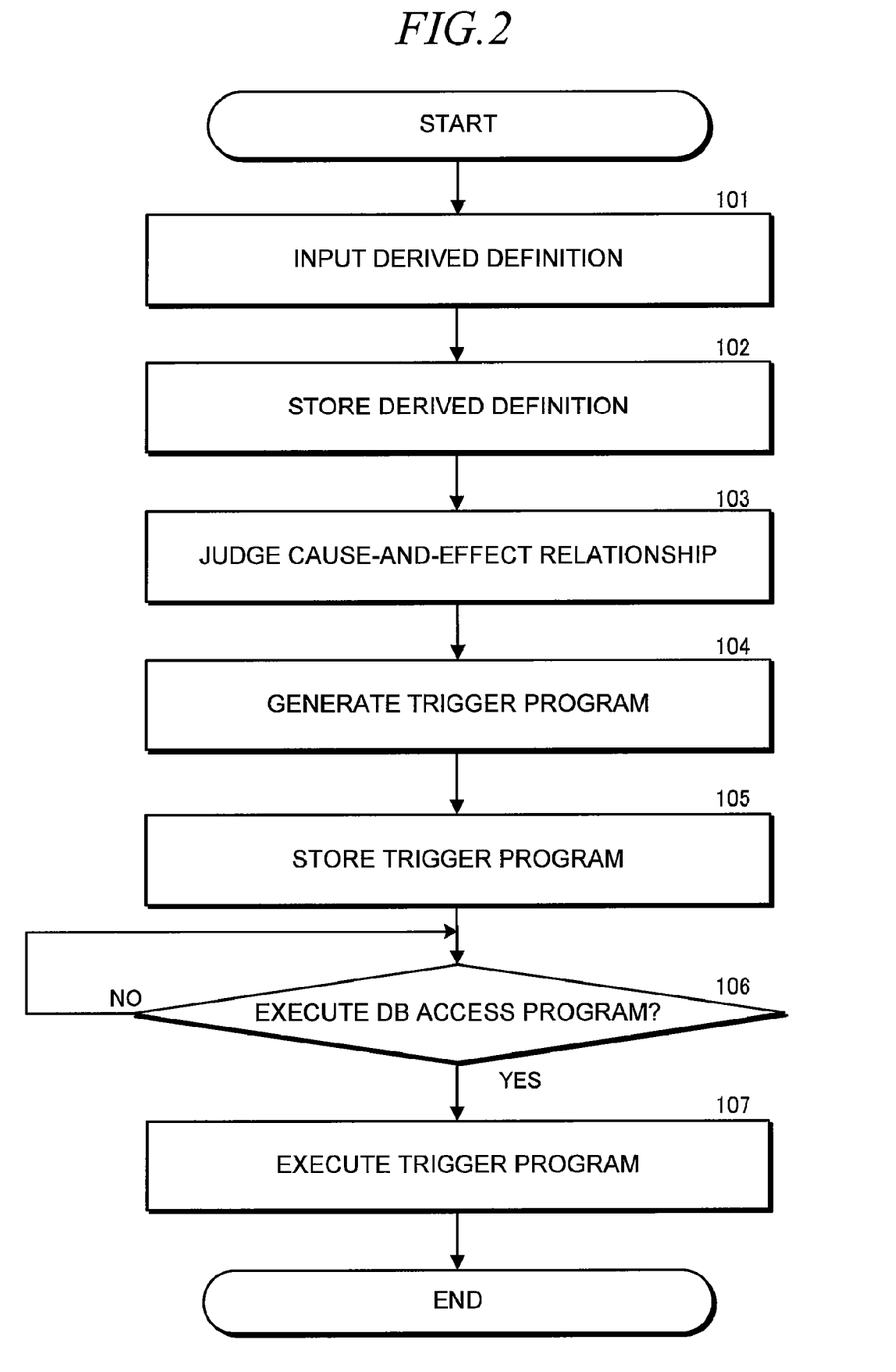
FIG. 2 is a flowchart illustrating a processing flow according to the embodiment illustrated in FIG. 1.
Figure 3:
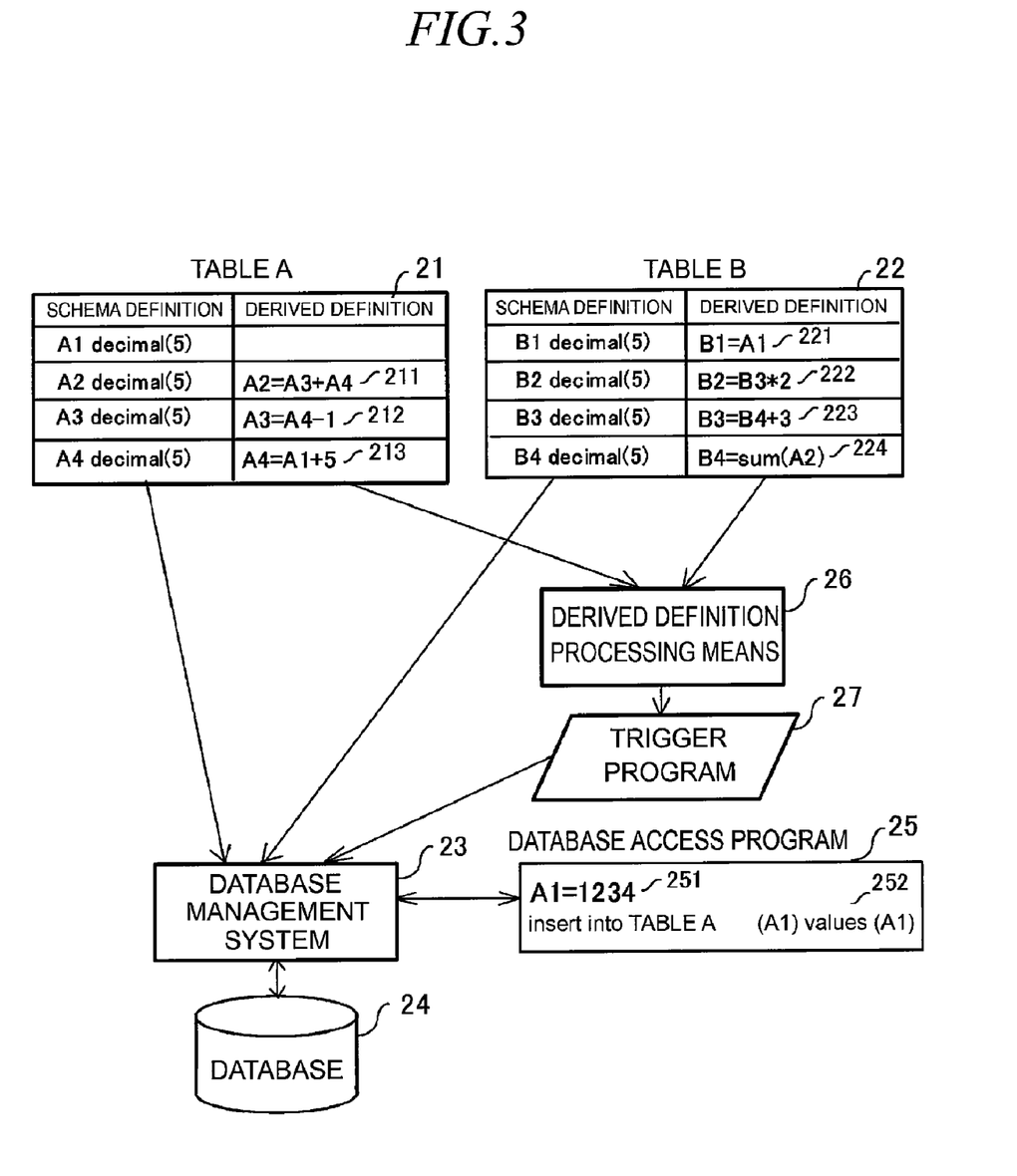
FIG. 3 is an explanatory diagram illustrating an example of access to a database according to the embodiment illustrated in FIG. 1.
Figure 4:
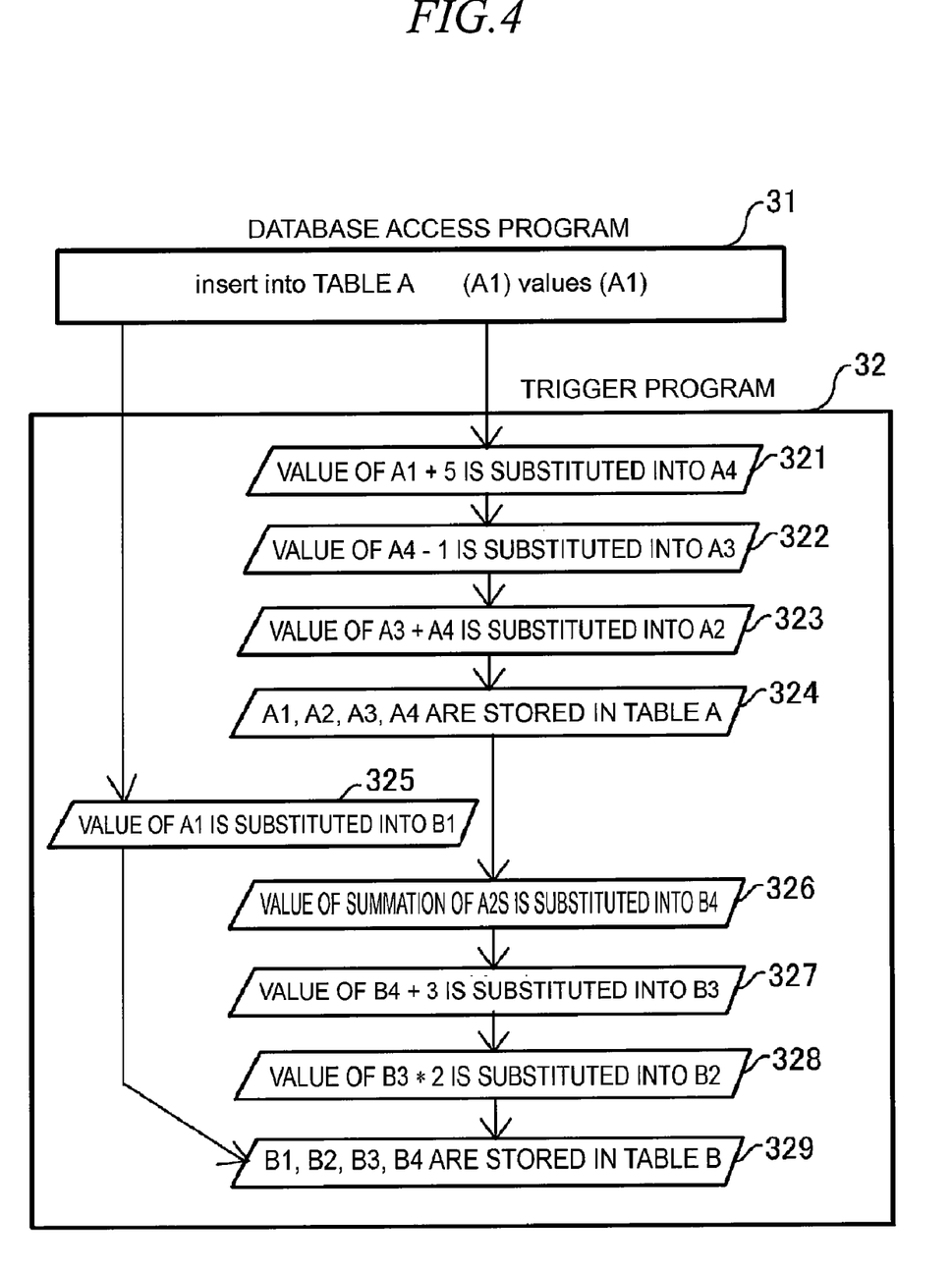
FIG. 4 is an explanatory diagram illustrating an example of an execution of a trigger program according to the embodiment illustrated in FIG. 1.

An example of processing according to the present embodiment configured as shown above will now be described with reference to FIGS. 2 to 4.

[Summary of Processing]

First, a summary of processing of the present embodiment will be described using a flowchart illustrated in FIG. 2. Let us assume that a schema definition inputted by a user in advance using the inputting means 7 is stored in the schema definition storage means 2. When a derived definition corresponding to such a schema definition is inputted by the user using the inputting means 7 (step 101), the derived definition is stored in the derived definition storage means 3 (step 102).

Based on a cause-and-effect relationship of derived definitions, the judging unit 26a of the derived definition processing means 26 judges a sequence in which the derived definitions are to be executed (step 103), and according to the judgment result, the generating unit 26b generates a trigger program 27 (step 104). The trigger program 27 is stored in the trigger program storage means (step 105).

Then, triggered by the execution of the database access program 25 by the database management system 23 (step 106), the trigger program 27 is executed by the database management system 23 (step 107).

[Specific Example of Processing]

Next, a specific example of processing using derived definitions 21 and 22 will be described with reference to FIGS. 3 and 4. In FIG. 3, reference numeral 21 denotes a derived definition of a table A and 22 denotes a derived definition of a table B. Reference numeral 27 denotes a trigger program converted and generated by derived definition processing means 26. Reference numeral 25 denotes a database access program for accessing a database 24.

The derived definition 21 of the table A and the derived definition 22 of the table B are inputted by a user using the inputting means 7 and stored in the derived definition storage means 3 in association with respective data items described in the schema definition storage means 2. At this point, the user need only describe a definition by solely focusing on a cause-and-effect relationship that shows "which other data item has a value from which the value of a given data item is solely derived". In other words, the user is not required to consider the sequence in which computations among the data items are to be performed.

For example, in table A, reference numeral 211 denotes an example defining that a value of A2 is derived by a sum of a value of A3 and a value of A4. Reference numeral 212 denotes an example defining that a value of A3 is derived from a value obtained by subtracting 1 from a value of A4. Reference numeral 213 denotes an example defining that a value of A4 is derived from a value obtained by adding 5 to a value of A1.

Furthermore, similarly in the table B, reference numeral 221 denotes an example defining that a value of B1 is derived from a value of A1 in the table A. Reference numeral 222 denotes an example defining that a value of B2 is derived from a value obtained by multiplying a value of B3 by 2. Reference numeral 223 denotes an example defining that a value of B3 is derived from a value obtained by adding 3 to a value of B4. Reference numeral 224 denotes an example defining that a value of B4 is derived from a summation of values of A2 of all records in the table A.

In this case, contents respectively described in the derived definition 21 and the derived definition 22 can be independently described in individual data items defined by the schema. Therefore, it is unnecessary to consider in what sequence computations of the respective data items must be executed.

Based on the defined derived definitions 211 to 213 of the table A and the defined derived definitions 221 to 224 of the table B, the judging unit 26a of the derived definition processing means 26 judges a sequence of execution from the respective cause-and-effect relationships. For example, since the data items determined by the value of A1 are A4 that is determined by the derived definition 213 in the table A and B1 that is determined by the derived definition 221 in the table B, these derived definitions first become executable.

Next, since the data item determined by the value of A4 is A3 that is determined by the derived definition 212 in the table A, the derived definition 212 becomes executable. Next, since the data item determined by the values of A3 and A4 is A2 that is determined by the derived definition 211, the derived definition 211 becomes executable.

Next, since the data item determined by the value of A2 is B4 that is determined by the derived definition 224 in the table B, the derived definition 224 becomes executable. Next, since the data item determined by the value of B4 is B3 that is determined by the derived definition 223, the derived definition 223 becomes executable. Next, since the data item determined by the value of B3 is B2 that is determined by the derived definition 222, the derived definition 222 becomes executable. As shown, in the example illustrated in FIG. 3, an execution sequence of derived definitions can be determined by judging whether or not a given data item can be determined by a data item already determined and preferentially executing the derived definition of the data item that can be determined.

Subsequently, based on the judged execution sequence, the generating unit 26b generates a trigger program 32 such as that illustrated in FIG. 4. A group of instructions 321 to 329 in the trigger program 32 respectively correspond to derived definitions 211 to 213 and 221 to 224 of the derived definition 21 of the table A and the derived definition 22 of the table B. In this manner, based on the cause-and-effect relationships of values of the respective data items, the trigger program 32 that is interpretable and executable by the database management system 23 is automatically converted and generated by the generating unit 26b.

The generated trigger program 32 is read by the database management system 23 and registered in the trigger program storage means 5. Subsequently, by executing the database access program 25, the database management system 23 executes the trigger program 32 at the moment a change is made to data items described in the derived definitions 21 and 22.

Access to the database 24 is enabled from the database access program 25 by an instruction of a SQL statement. In this case, merely describing a substitution instruction 251 to substitute a value 1234 into A1 and an insert statement 252 that is a SQL statement to store the value of A1 in the table A of the database 24 will suffice. Consequently, descriptions 152 to 1510 in a conventional database access program description illustrated in FIG. 6 become unnecessary. Alternatively, a single line of the description of the insert statement 252 that is a SQL statement provides the same processing result.

As illustrated by the example in FIG. 4, the execution of the program statement 252 described in the database access program 25 is triggered by the execution of an insert statement 31 that is a SQL statement to A1 that is a data item in the table A, in which case the instructions 321 to 329 in the trigger program 32 are to be chain-executed as follows.

That is, triggered by the storage 31 of a value of A1 into the table A, a substitution of a value obtained by adding 5 to the value of A1 into A4 is executed (321). In addition, triggered by the storage of the value of A1, a substitution of the value of A1 into B1 is executed (325). Furthermore, triggered by the substitution into the value of A4, a substitution of a value obtained by subtracting 1 from the value of A4 into A3 is executed (322). Furthermore, triggered by the substitution into the value of A3, a substitution of a sum of the values of A3 and A4 into A2 is executed (323). In this manner, triggered by the substitution of the values of all data items described in the schema of the table A, storage into the table A is executed (324).

Next, triggered by the storage into the table A, a substitution of a summation of the values of all A2s existing in the table A into B4 is executed (326). In addition, triggered by the substitution into the value of B4, a substitution of a value obtained by adding 3 to the value of B4 into B3 is executed (327). Furthermore, triggered by the substitution into the value of B3, a substitution of a value obtained by multiplying B3 by 2 into B2 is executed (328). In this manner, triggered by the substitution of the values of all data items described in the schema of the table B, storage into the table B is executed (329).

Accordingly, triggered by the storage of A1 that is a single data item into the database, all processing (321 to 329) in the trigger program 32 is automatically chain-executed.

[Advantages of Embodiment]

Advantages of the present embodiment (present invention) described above are as follows. That is, according to the present embodiment, derived definitions for deriving the respective data items can be described without having to consider the sequence in which the respective derived definitions are executed. As a result, while it is conventionally required that consideration be given to the execution sequence when a user creates a sequential program, the present embodiment significantly reduces the user's effort for considering the execution sequence.

Since a CPU sequentially executes a program, the fact remains that the program to be ultimately executed must be described in a predetermined sequence. However, there is no reason that all future attempts to program a database by a user must be bound by this constraint. An ideal programming method ought to be not a method that requires a human to suit the convenience of a machine but a method that enables programming that suits the naturally-occurring thoughts of a human. The present embodiment frees a user from the constraints of sequential programming, and is significant in that the skill required of a person using the database can be reduced and that database programming styles themselves can be dramatically altered.

In addition, since only a derived definition for deriving each data item need be considered and the mutual relationships between all data items need not be considered, the effort required of a user can be further reduced.

Furthermore, with a database access program, merely making a change to a data item that acts as an initial trigger shall suffice. Therefore, the description length of the database access program decreases dramatically.

For example, while a database access program 15 in the conventional model illustrated in FIG. 6 requires a program description length of 10 lines from 151 to 1510, the present embodiment only requires a program description length of 2 lines of 251 and 252. Other descriptions need only be described in the derived definition 21 of the table A and the derived definition 22 of the table B illustrated in FIG. 3, which are descriptions of cause-and-effect relationships among respective data items. Therefore, even if there is a large number of database access programs 25 for accessing the tables A and B, the program description length of each database access program 25 can be significantly reduced.

Moreover, the present embodiment is not simply characterized by automatically generating a program or chain-processing desired data. This becomes evident through a comparison with a function in conventional spreadsheet software or processing similar to such a function. For example, when using (retrieving, displaying, updating, or the like) a given piece of data, an Excel function performs a computation on a specified argument based on a predefined operational expression and performs a virtual tally by returning a return value.

In addition, for example, an operational expression can be written into a view description of a database management system. This is similar to a function in that a virtual tally is performed when using data. Furthermore, some database management systems are capable of virtually obtaining a value by describing a mathematical expression using data items in the same table. In this case, the only difference is that a mathematical expression is directly written instead of using a function, and the fact remains that a computation or a tally is virtually performed upon the use of data.

However, the present embodiment does not virtually obtain a calculation or tally result as was the case in the aforementioned functions and similar processing. The present embodiment is characterized in that, upon data update, related data that affect the data is updated and a computation result is actually retained in the database. For example, upon storage of A1 in the database 24 by the insert statement of SQL denoted in FIG. 4 by reference numeral 31, values of all items affected by A1 or, in other words, A2, A3, A4, B1, B2, B3, and B4 are automatically chain-updated.

The present embodiment differs from functions and the like in this regard. Functional programming is extremely time-consuming because a function runs when using data. In the present embodiment, since the database retains data actually computed and updated, no computation is required when using (reading) the data and the data can be immediately retrieved. Generally, between data update and data read, data read is performed much more frequently than data update. Therefore, according to the present embodiment, the load on the entire system can be reduced.

Moreover, in the present embodiment, even a value straddling different tables is computed, tallied, and updated. For example, reference numeral 224 illustrated in FIG. 3 denotes tallying A2s in the table A and entering a summation thereof into B4. Therefore, it can be stated that the present embodiment is more superior to a conventional database management system that is incapable of tallying and computing data straddling different tables even when employing a function method.

[Other Embodiments]

The present invention is not limited to the embodiment described above, and any specific mode of a schema definition, a derived definition, a trigger program, and a database access program can be adopted. In addition, criteria for judging an execution sequence of a trigger program from a cause-and-effect relationship of respective data items in a derived definition are similarly not limited to those exemplified in the embodiment described above.

For example, in the aforementioned embodiment, since A4=A1+5 and A2=A3+A4, there is a direct cause-and-effect relationship between A4 and A2 and the execution sequence of the expressions is to be determined by the sequential relationship. In addition, if a cause-and-effect relationship exists, albeit indirect, such as the case of A4=A1+5, A2=A3+1, and A3=A4−1, then the execution sequence of the respective expressions is to be determined by the sequential relationship.

However, if a cause-and-effect relationship does not exist between A4 and A2 as in the case of, for example, A4=A1+5 and A2=A1+1, then a computation sequence cannot be unambiguously determined. In this case, the aforementioned judging unit 26*a* can judge that the expressions have a same-level sequence and cause parallel processing, to be described later, to be performed, or determine an execution sequence based on predetermined criteria. An example of determining an execution sequence will be described below. It should be noted that this is merely an example and an execution sequence should be determined based on a processing ability of a system or according to the convenience of the system. As such, the present invention is not limited to this example.

Figure 5:
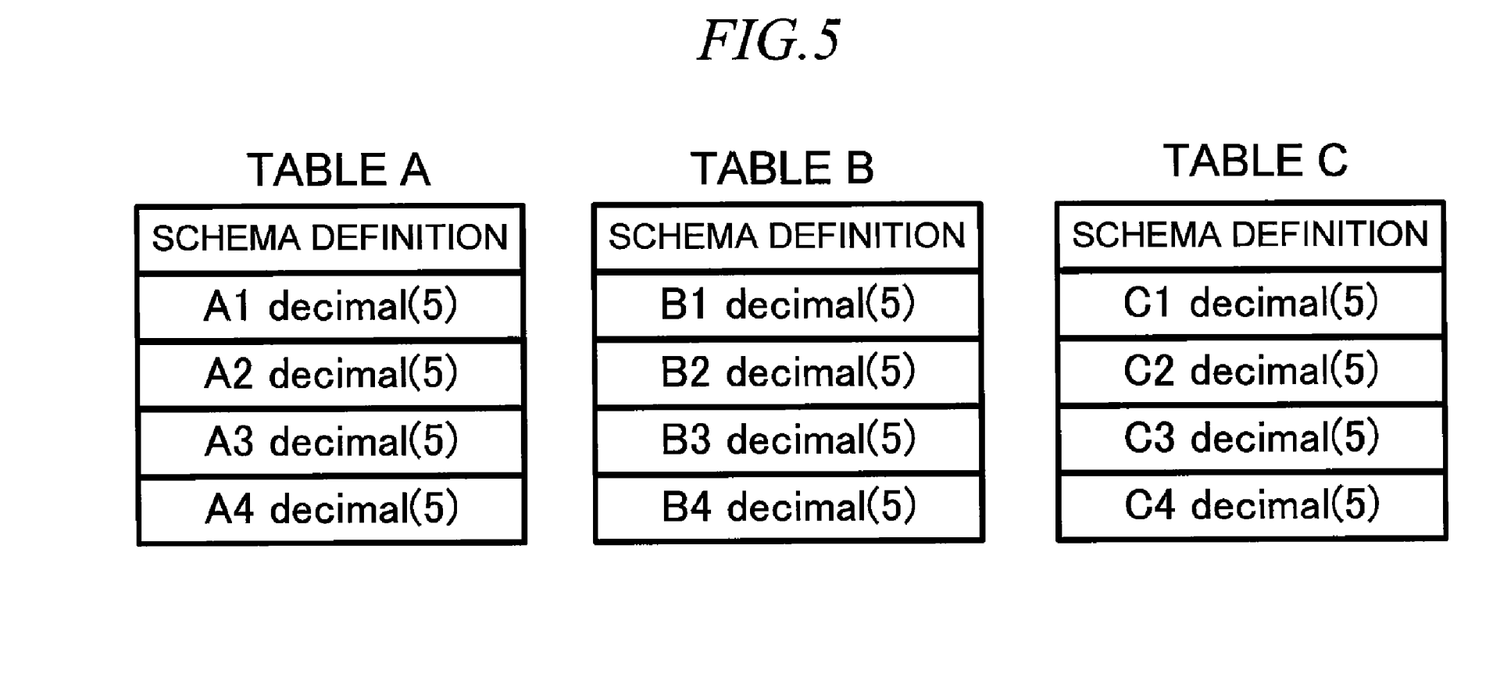
FIG. 5 is an explanatory diagram illustrating schema definitions of a table A, a table B, and a table C of another embodiment of the data-driven database processor according to the present invention.

Let us assume a case involving a table A, a table B, and a table C according to a schema definition illustrated in FIG. 5. Let us also assume that, in this case, the following expressions exist as derived definitions.

$$A4=A1+5$$

$$A2=A1+1$$

$$C1=\text{sum}(A1)$$

$$B4=\text{sum}(A1)$$

Now, if A1 is determined, then a sequence can be determined as follows.

[1. When expression is obtainable by same field in table (for example, A4=A1+5)]
(Method 1: Adopt Sequence of Field Descriptions in Schema)
Between A4 and A2, since A2 is described earlier in the schema definition in the aforementioned table A, the execution order is A2, A4.
(Method 2: Adopt Sequence According to Characters Such as Alphabet and Numerals of Field Names)
Between A4 and A2, since A2 takes precedence in alphanumeric order, the execution order is A2, A4.
[2. When expression also includes an expression obtainable by field of another table (for example, when expression includes B4=sum (A1)]

A conceivable method involves first executing an expression of the field in the same table (in the example, A2, A4; an execution sequence therein should be determined by applying the method described in [1 . . . ] above), and next executing the expression that uses a field in another table.

Furthermore, when there are a plurality of expressions using a field in another table, as described in [1 . . . ] above, execution can conceivably take place according to a sequence of table described in the schema (a sequence such as table A, table B, and table C) or a sequence according to characters in the table names. In this example, since the sequence of table definitions in the database is table A, table B, and table C, a determination of a value of A1 by the expression described above results in a sequence of A2, A4, B4, and C1.

In addition, expressions judged to have the same-level sequence among expressions defined by a derived definition statement can be parallel-processed. For example, according to the way computers are structured today, a single CPU can only execute processes sequentially. However, parallel processing can be performed with a processor having a plurality of CPUs. Consequently, data can be parallel-processed and processing speed can be increased.

Furthermore, the present invention is not limited to a configuration implemented by a single specific computer and can be configured by a plurality of server devices including a database server and a server for other data processing, or by a system in which processing is distributed over a plurality of computers according to each function block and the plurality of computers work together to perform processing. For example, the parallel processing described above can also be performed by distributed processing.

Moreover, while the following cause-and-effect relationships have been exemplified in the embodiment described above:
(a) a cause-and-effect relationship in a field in the same table;
(b) a cause-and-effect relationship in a field straddling tables, the following cause-and-effect relationships can also be considered:
(c) a cause-and-effect relationship in a field straddling a plurality of databases;
(d) a cause-and-effect relationship in a field straddling databases in other servers.

Furthermore, data to be handled by the present invention is not limited to any particular type of data. The present invention is widely applicable as a program for accessing an ordinary database.

The invention claimed is:
1. A data-driven database processor comprising:
schema definition storage unit for storing a schema definition of a database;
derived definition storage unit for storing a derived definition describing a cause-and-effect relationship between a data item in the schema definition and another data item for deriving the data item solely without considering the sequence in which the respective derived definitions is executed;
a judging unit for judging, based on the cause-and-effect relationship, a sequence in which the derived definition is executed;
derived definition processing unit for generating a trigger program that makes a chain of changes to data items according to the sequence judged by the judging unit;
a database management system for executing the trigger program when a change is made to another data item that affects the data item; and
database access program storage unit for storing a database access program which makes a change to another data item that affects the data item and which is executable by the database management system,
wherein the judging unit judges an execution sequence so that the derived definition, capable of deriving the data item solely using an already-determined data item, is preferentially executed.

2. A data-driven database processing method, wherein a computer is configured by a program to execute:
processing of storing a schema definition of a database;
processing of storing a derived definition describing a cause-and-effect relationship between a data item in the schema definition and another data item for deriving the data item solely without considering the sequence in which the respective derived definitions is executed;
processing of judging, based on the cause-and-effect relationship, a sequence in which the derived definition is executed and generating a trigger program that makes a chain of changes to the data items according to the judged sequence; and
processing of executing the trigger program when a change is made to another data item that affects the data item,
wherein the computer executes:
processing of storing a database access program that makes a chain of changes to the other data item that affects the data item; and
processing of executing the database access program and the trigger program.

3. A computer-executable data-driven database processing program that causes a computer to execute:
processing of storing a schema definition of a database;
processing of storing a derived definition describing a cause-and-effect relationship between a data item in the schema definition and another data item for deriving the data item solely without considering the sequence in which the respective derived definitions is executed;
processing of judging, based on the cause-and-effect relationship, a sequence in which the derived definition is executed and generating a trigger program that makes a chain of changes to the data items according to the judged sequence; and
processing of executing the trigger program when a change is made to another data item that affects the data item,
wherein the program causes the computer to execute:
processing of storing a database access program that makes a chain of changes to the other data item that affects the data item; and
processing of executing the database access program and the trigger program.

* * * * *